(12) United States Patent
Werius et al.

(10) Patent No.: US 10,986,969 B2
(45) Date of Patent: Apr. 27, 2021

(54) DUST CONTAINER FOR A VACUUM CLEANER

(71) Applicant: Aktiebolaget Electrolux, Stockholm (SE)

(72) Inventors: Patrik Werius, Stockholm (SE); Bert Scheufen, Nuremberg (DE)

(73) Assignee: Aktiebolaget Electrolux

( * ) Notice: Subject to any disclaimer, the term of this patent is extended or adjusted under 35 U.S.C. 154(b) by 215 days.

(21) Appl. No.: 16/099,358

(22) PCT Filed: May 9, 2016

(86) PCT No.: PCT/EP2016/060308
§ 371 (c)(1),
(2) Date: Nov. 6, 2018

(87) PCT Pub. No.: WO2017/194081
PCT Pub. Date: Nov. 16, 2017

(65) Prior Publication Data
US 2019/0208973 A1    Jul. 11, 2019

(51) Int. Cl.
*A47L 9/14* (2006.01)
*B01D 46/00* (2006.01)
*B01D 46/04* (2006.01)

(52) U.S. Cl.
CPC ........... *A47L 9/1445* (2013.01); *A47L 9/1427* (2013.01); *B01D 46/0005* (2013.01); *B01D 46/04* (2013.01)

(58) Field of Classification Search
CPC ... B01D 46/0005; B01D 46/04; A47L 9/1427; A47L 9/1436; A47L 9/1445
See application file for complete search history.

(56) References Cited

U.S. PATENT DOCUMENTS

| 2,864,465 A | 12/1958 | Welsh et al. |
| 2,995,206 A | 8/1961 | Smithson |

(Continued)

FOREIGN PATENT DOCUMENTS

| DE | 3518346 A1 | 11/1986 |
| DE | 20101471 U1 | 4/2001 |

(Continued)

OTHER PUBLICATIONS

International Search Report and Written Opinion for International Application No. PCT/EP2016/060308, dated Jan. 5, 2017—9 pages.

(Continued)

*Primary Examiner* — Jason M Greene
(74) *Attorney, Agent, or Firm* — RatnerPrestia

(57) ABSTRACT

A vacuum cleaner dust container having a dust bag, made of an air permeable material, and a connector plate, surrounding an opening in the dust bag. The connector plate is configured by the connector plate being slid into a holder of a vacuum cleaner to correctly position the opening therein. The connector plate has a central portion surrounding the opening, and an extending portion projecting from the central portion. The extending portion has a lower bending stiffness than the central portion about an axis perpendicular to the direction in which it is inserted. Thereby extending portion can be bent out of the plane of the central portion and into a curvature without bending the central portion, which facilitates fitting the connector plate in a vacuum cleaner canister with curved inner walls.

19 Claims, 3 Drawing Sheets

(56) References Cited

U.S. PATENT DOCUMENTS

| | | | |
|---|---|---|---|
| 3,432,998 A | 3/1969 | Downey | |
| 4,075,383 A | 2/1978 | Anderson et al. | |
| 4,262,384 A | 4/1981 | Bowers | |
| 4,589,894 A | 5/1986 | Gin et al. | |
| 4,678,486 A * | 7/1987 | Jacob | A47L 9/00 55/374 |
| 4,719,942 A | 1/1988 | Hayner | |
| 4,748,712 A | 6/1988 | DiGiovanni | |
| 4,851,019 A | 7/1989 | Ahlf et al. | |
| 4,861,357 A | 8/1989 | Gavin et al. | |
| 4,885,013 A | 12/1989 | Ahlf et al. | |
| 4,961,765 A | 10/1990 | Gühne et al. | |
| 5,039,324 A | 8/1991 | Goldberg | |
| 5,089,038 A | 2/1992 | Kopco et al. | |
| 5,145,727 A | 9/1992 | Potts et al. | |
| 5,158,635 A | 10/1992 | Schmierer et al. | |
| 5,221,303 A | 6/1993 | Gühne et al. | |
| 5,230,724 A | 7/1993 | Marafante | |
| 5,468,271 A | 11/1995 | Sauer et al. | |
| 5,468,272 A | 11/1995 | Schmierer | |
| 5,472,460 A | 12/1995 | Schmierer | |
| 5,472,465 A | 12/1995 | Schmierer | |
| 5,544,385 A | 8/1996 | Jailor et al. | |
| 5,593,479 A | 1/1997 | Frey et al. | |
| 5,613,989 A | 3/1997 | Bosses | |
| 5,647,881 A | 7/1997 | Zhang et al. | |
| 5,688,298 A | 11/1997 | Bosses | |
| 5,725,620 A | 3/1998 | Perea et al. | |
| 5,772,712 A | 6/1998 | Perea et al. | |
| 6,033,451 A | 3/2000 | Fish et al. | |
| 6,045,595 A | 4/2000 | Freudenberg | |
| 6,136,056 A | 10/2000 | Krehan | |
| 6,156,086 A | 12/2000 | Zhang | |
| 6,171,369 B1 | 1/2001 | Schultink et al. | |
| 6,183,536 B1 | 2/2001 | Schuitink et al. | |
| 6,193,773 B1 | 2/2001 | Schlör et al. | |
| 6,488,731 B2 | 12/2002 | Schultheiss et al. | |
| 6,537,644 B1 | 3/2003 | Kauschke et al. | |
| 6,579,350 B2 | 6/2003 | Doherty | |
| 6,669,761 B2 | 12/2003 | Schultheiss et al. | |
| 6,716,262 B2 | 4/2004 | Zimet et al. | |
| 6,733,555 B1 | 5/2004 | Wilder | |
| RE38,842 E | 10/2005 | Fish et al. | |
| 7,024,724 B2 | 4/2006 | Ponjican et al. | |
| 7,258,709 B2 | 8/2007 | Ponjican et al. | |
| D600,868 S | 9/2009 | Rennecker et al. | |
| 7,637,975 B2 | 12/2009 | Stein et al. | |
| 7,794,516 B2 | 9/2010 | McAllise et al. | |
| 8,066,803 B2 | 11/2011 | Sauer et al. | |
| 8,070,858 B2 | 12/2011 | Schultink et al. | |
| 8,092,562 B2 | 1/2012 | Sauer et al. | |
| 8,152,879 B2 | 4/2012 | Schultink et al. | |
| 8,449,639 B2 | 5/2013 | Sauer et al. | |
| 9,074,622 B2 | 7/2015 | Morgan et al. | |
| 2018/0368635 A1 * | 12/2018 | Schultink | A47L 9/1436 |
| 2019/0350421 A1 * | 11/2019 | Werius | A47L 9/1445 |

FOREIGN PATENT DOCUMENTS

| | | | |
|---|---|---|---|
| EP | 0682908 A1 | 11/1995 | |
| EP | 1917897 A2 * | 5/2008 | A47L 9/1445 |
| JP | 11-206652 * | 8/1999 | A47L 9/14 |
| JP | 11206652 A | 8/1999 | |
| WO | 0224046 A1 | 3/2002 | |

OTHER PUBLICATIONS

Chinese Office Action issued in Chinese Application No. 201680085520.4, dated Jun. 24, 2020 with translation, 22 pages.
European Communication Pursuant to Article 94(3) EPC, for European Application No. 16 720 870.1, dated Nov. 19, 2019, 5 pages.

\* cited by examiner

DUST CONTAINER FOR A VACUUM CLEANER

This application is a U.S. National Phase application of PCT International Application No. PCT/EP2016/060308, filed May 9, 2016, which is incorporated by reference herein.

TECHNICAL FIELD

The present disclosure relates to a dust container for a vacuum cleaner, the dust container comprising a dust bag, made of an air permeable material, and a connector plate, surrounding an opening in the dust bag, such that the connector plate can correctly position the opening within a vacuum cleaner by the connector plate being inserted in a holder of the vacuum cleaner.

BACKGROUND

An example of such a container is disclosed for instance in WO-02/24046-A1. Thanks to the connector plate, the opening of the dust bag can be reliably positioned and oriented to receive a flow of dust laden air from the vacuum cleaner inlet. Further, the connector plate can trigger a feedback switch in the holder of the vacuum cleaner to verify that a dust container has been correctly installed in the holder, thus enabling the vacuum cleaner to prevent use in case of an absent or incorrectly installed dust container. Such use could otherwise damage the vacuum cleaner by injecting heavily dust laden air into a fan/motor arrangement.

One problem associated with dust containers of this type is how to make the dust container operable with even more efficient and compact vacuum cleaners.

SUMMARY

One object of the present disclosure is therefore to provide a dust container that can be more efficiently used with compact vacuum cleaners. This object is achieved by means of a dust container as defined in claim 1. More specifically, in a dust container of the initially mentioned kind, the connector plate comprises a central portion, which surrounds the dust bag opening, and an extending portion, which projects from the central portion in the central portion's plane thereof. The extending portion is configured to have a lower bending stiffness about an axis perpendicular to the direction in which it extends from the central portion than has the central portion. Thereby, the extending portion can be bent out of the plane of the central portion into a step-wise or continuous curvature, substantially without bending the central portion. This means that the connector plate can be inserted in a partly curved holder in the vacuum cleaner. Such a party curved holder can follow the inner wall of a vacuum cleaner canister efficiently, taking up less space. At the same time, the central portion can remain flat to provide reliable sealing between the inlet hose and the dust bag.

The extending portion may be configured to be more easily bent backwards, towards the dust bag.

The central portion and the extending portion may have a substantially uniform width from a distal edge of the extending portion to the edge of the central portion opposite to said distal edge. This allows the connector plate to be easily slid into a vacuum cleaner holder.

The extending portion may be configured to have a lower bending stiffness by means of a plurality of living hinges located along the extending portion at regular intervals along the direction that the extending portion extends from the central portion. This allows the lower stiffness to be achieved in an injection molding process, not requiring further process steps to provide this feature. Living hinges may be provided at 3-6 or more locations along the direction that the extending portion extends from the central portion. The thickness of segment portions in between the living hinges may be in the range 2.0-4.5 mm, and the thickness at the living hinge may be in the range 0.1-0.4 mm.

Alternatively, the extending portion may be configured to have a lower bending stiffness by being thinner than the central portion, or by comprising a material with a lower modulus of elasticity than the material of the central portion. The latter alternative may be obtained by providing the connector plate in a two-component injection molding process.

As yet another alternative, the lower bending stiffness may be accomplished by the extending portion having a smaller extension in a lateral direction than has the central portion, or by means of a number of perforations being provided along the length of the extending portion. Alternatively, the extending portion and the central portion may have reinforcements in a pattern configured to provide the lower bending stiffness in the extending portion.

The extending portion may comprise lateral arm portions extending from the central portion and a bridge portion interconnecting the arms at their distal ends. This leaves room to arrange e.g. a shutter arrangement in between the arm portions. At least one locking opening may be provided in the bridge portion, which keeps the connector plate in place in the holder until pulled with a predetermined force when the dust container is to be replaced.

A shutter may be connected to the central portion in between the lateral arm portions, the shutter having an opening and being folded on top of the central portion such that the shutter opening coincides with the opening of the dust bag, wherein the shutter is guided to close the opening by sliding the shutter away from the extending part. This allows the dust bag to be closed before being removed from the vacuum cleaner holder. The distal end of the shutter may comprise a handle to facilitate this operation.

The connector plate may consist of injection molded polypropylene, PP.

The extending portion may be devised to be leading in the direction of insertion into a holder, and comprise means to interact with functions in the holder. Typically, an indicator on the connector plate may show the direction of insertion.

A connector plate that can be used in such a dust container is also considered, and may be varied and altered in the same way as the dust container.

BRIEF DESCRIPTION OF THE DRAWINGS

FIGS. 3 and 4 show side views of the plate in FIG. 2 in unbent and bent states, respectively.

DETAILED DESCRIPTION

Figure 1:
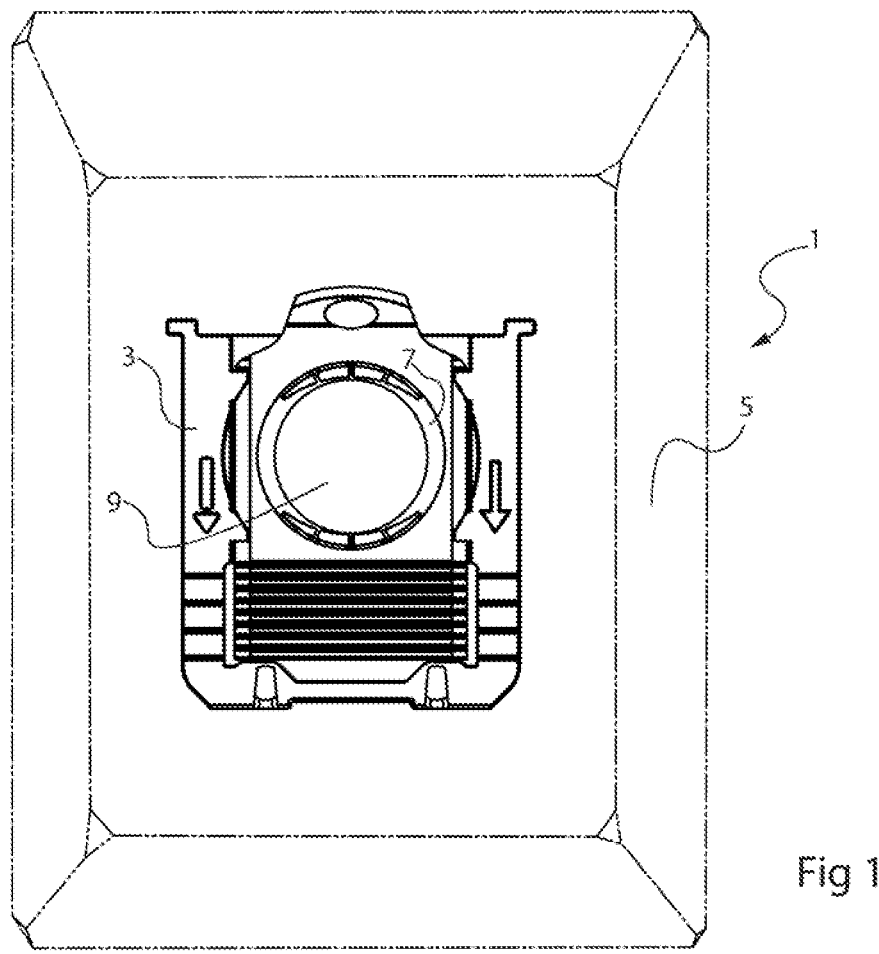
FIG. 1 shows a dust container for a vacuum cleaner.

The present disclosure relates to a dust container for a vacuum cleaner, as illustrated with an example in FIG. 1. The dust container has a dust bag 5, which is schematically indicated and is made of an air permeable material, as is well known per se. A connector plate 3 is attached to the dust bag 5, for instance by being glued thereto, and has an opening 9 coinciding with an opening in the dust bag 5, such that the opening of the connector plate also becomes the opening of the dust bag as a whole. The connector plate 3 is configured to position the opening 9 of the dust bag in a correct manner in relation to an air inlet in the body or canister of a vacuum cleaner. This can be carried out by sliding the connector plate into a holder or socket in the vacuum cleaner. This operation positions the opening 9 correctly to receive a flow of dust laden air thereby entering the bag, which is capable to remove most of the dust from the air flow. A gasket 7 may be attached to the connector plate 3 at the opening 9 so as to provide a sealing function, reducing leaks in the flow from an inlet hose to the dust bag 5.

Figure 2:
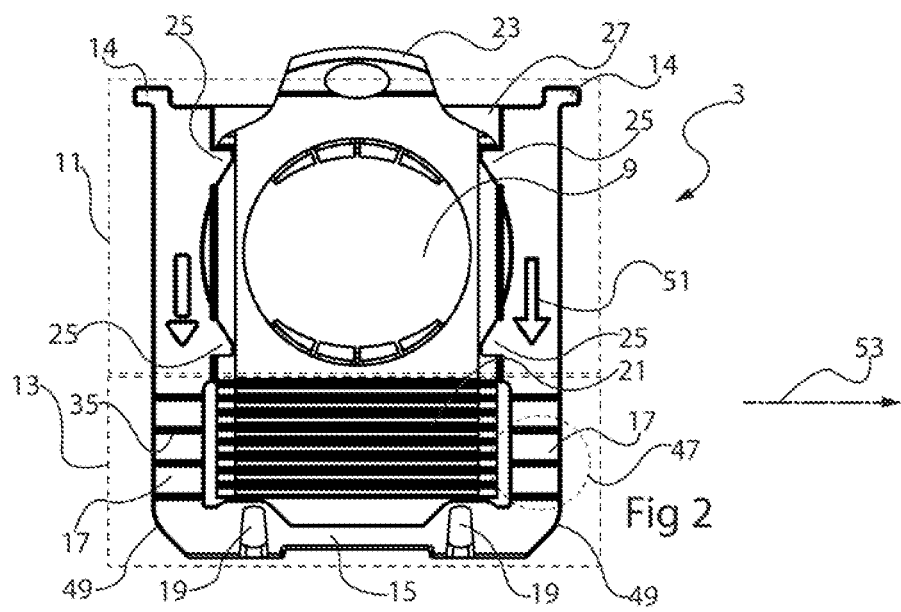
FIG. 2 shows a connector plate for a dust container.
Figure 3:
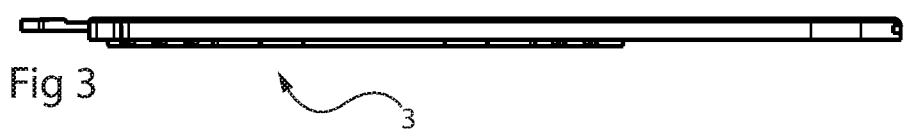
FIG. 3 shows a perspective view of a connector plate, where an extending portion is bent out of the plane of a central portion.

FIG. 2 shows a plan view of a connector plate 3. In the present disclosure, the connector plate 3 comprises a central portion 11, which is central with respect to the opening 9 which it surrounds, and may be substantially flat and rectangular. Further, the connector plate 3 comprises an extending portion 13, which may project from an edge of the central portion 11.

When used in a vacuum cleaner, the connector plate 3 may be slid into a holder in the vacuum cleaner with the extending portion leading in the direction of insertion and the central portion as a trailing part. The width of the central portion 11 and the extending portion 13 may be substantially uniform from a distal edge 29 of the extending portion, being inserted first, to the edge 31 of the central portion 11 opposite to the distal edge 29. This allows the holder to guide the insertion of the connector plate. Close to said distal edge 29, the connector plate may however be slightly tapered to facilitate insertion by providing rounded corners 49. Indicator arrows 51 may be embossed in the connector plate 3 to make sure that the user inserts the connector plate correctly. Edges of the connector plate 3 become supported by the holder. Tabs 14 extending laterally from the central portion 11 at the corners most distant from the extending portion 13 may be provided to rest on the exterior of the holder at its entry point.

The central and the extending portions 11, 13, may extend in a common plane, and may be made in one piece, for instance by injection molding polypropylene, PP. Other plastic materials can be used and reinforced plastic can be considered. Together, the central and extending portions 11, 13 provide a reliable fixation of the dust bag opening 9 in the vacuum cleaner. Additionally, the extending portion 13 may provide a locking function that retains the connector plate in the holder, and an indicating function, triggering a sensor or switch in the holder, that makes the vacuum cleaner aware of a dust bag being correctly inserted, thereby allowing the vacuum cleaner to disable use of a suction function unless a dust bag is correctly fitted.

As is further illustrated in FIG. 2, the extending portion may 13 comprise lateral arm portions 17, extending from the central portion 11 and a bridge portion 15, interconnecting the arms at their distal ends, i.e. at the opposite of the central portion 11. This arrangement serves to leave a free space in between the arm portions 17, which may be used by a shutter arrangement, as will be shown. The bridge portion 15 may comprise locking openings 19, which interact with a locking arrangement in the holder, which snaps into the openings when the connector plate is fitted, thereby requiring a predetermined pulling force, in the direction opposite to the insertion direction, in order to remove the dust bag. Thereby, the dust bag is not removed inadvertently.

In the present disclosure, the extending portion 13 has a decreased bending stiffness compared to the central portion 11. More specifically, the bending stiffness about an axis 53 is lower. This axis 53 is perpendicular to the direction in which extending portion 13 extends from the central portion 11, i.e. the direction in which the connector plate is inserted into a holder, and parallel to the plane of the central portion. The extending portion may therefore be bent out of the plane of the central portion 11 and into a curvature substantially without bending the central portion 11.

This means that the connector plate can easily be inserted into a holder where the inner part of the holder, that takes up the connector plate's extending portion 13, can be curved. The insertion into the holder forces the extending portion to be bent. Thereby the holder can better use the available space inside a vacuum cleaner canister, which may have a curved inner wall. The holder may closely follow the inner wall, such that the dust bag 5 may be allowed to expand to a greater extent, thereby increasing the available dust bag volume. The whole length of the connector plate may still contribute in keeping the dust bag 5 safely in the correct position.

Additionally, it becomes easier to locate the end of the holder, which receives the leading distal edge 29 of the extending portion, closer to the part of the vacuum cleaner that contains e.g. control electronics. In general, a greater freedom to locate the end of the holder where desired is obtained. In one example, a mechanical function may be provided in the holder end, verifying that a bag is correctly installed and prohibiting closing of a canister hatch unless a bag is provided. Using a curved holder, allows this function to be located at a number of positions along the canister periphery. In another example, if the inlet is located in the front of a canister, the connector plate is centered around this inlet. The holder may still lead the extending portion 13 along the curved inner wall of the canister towards the rear of the canister where suitably the motor/fan combination, driving the air flow, and the associated electronics are located. This makes it possible to locate a function, that verifies that a dust bag is correctly installed, closer to the control electronics, which for instance simplifies wiring.

While the extending portion 13 is bent into a curved shape, the central portion 11 may remain flat, which facilitates the connection to the inlet hose of the vacuum cleaner, providing a tighter sealing function by means of the gasket 7 (c.f. FIG. 1).

Figure 4:
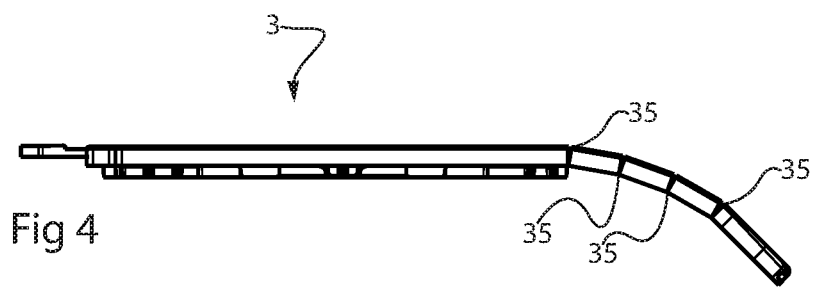
Figure 5:
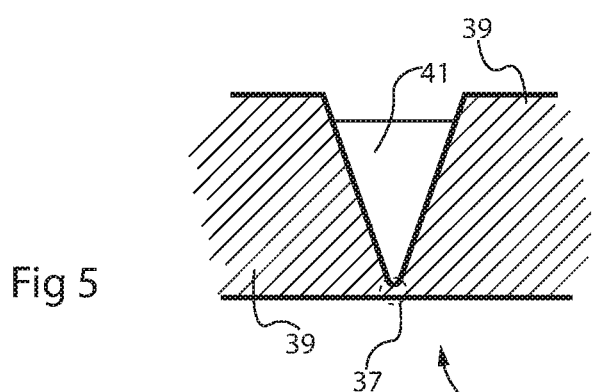
FIG. 5 illustrates schematically and in cross-section a living hinge.
Figure 8:
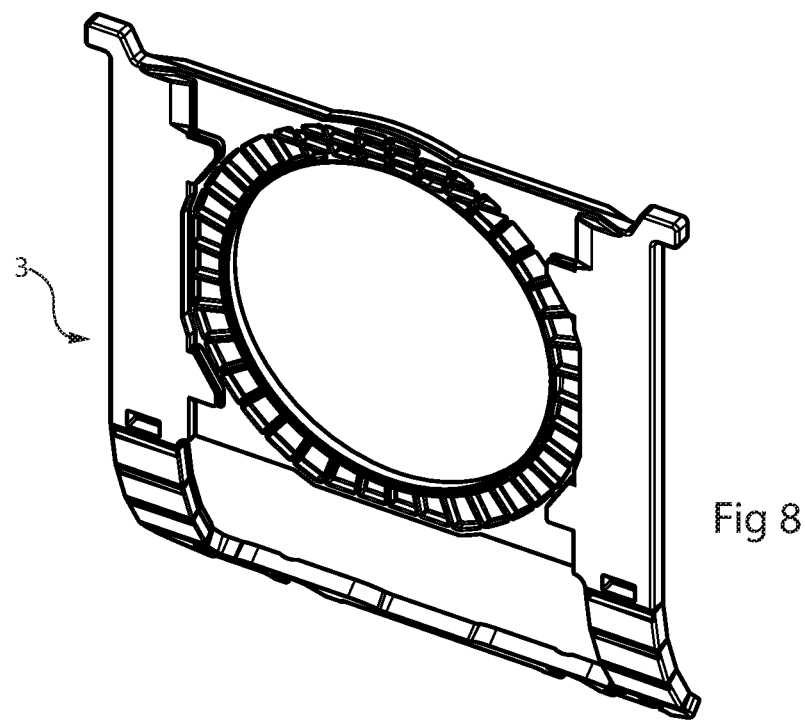
FIG. 8 shows a perspective view of a connector plate, where an extending portion is bent out of the plane of a central portion.

FIG. 8 shows a perspective view of a connector plate, where an extending portion is bent out of the plane of a central portion as if inserted into a holder forcing the extending portion to bend. Typically, the extending portion may be configured to be more easily bent backwards, towards the dust bag, as this is how the connector plate would best fit inside a canister. This can be accomplished by means of living hinges as will be described. FIG. 4 shows a side view of the plate in FIG. 8. As illustrated, living hinges 35 may be provided on the extending portion at four locations along the direction in which the connector plate is inserted in a holder. Those living hinges provide joints that are bent to an extent determined by the curvature of the holder, and need not be uniformly bent, as illustrated in FIG. 5. Needless to say fewer or more than four joints may be provided, although the extending portion 13 should be bent at a plurality of locations along the insertion direction to provide a step-wise curvature. 3-6 locations may be considered a suitable number.

Figure 7:
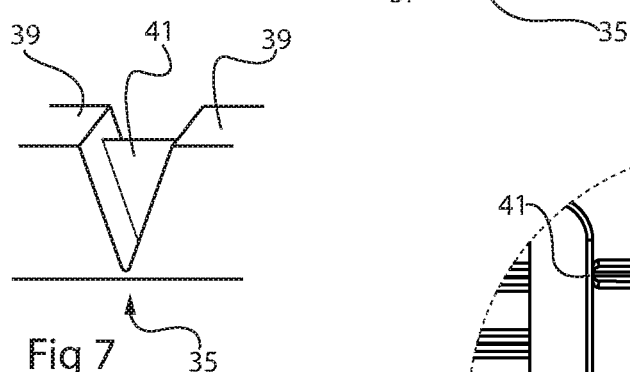
FIGS. 6-7 illustrate the living hinge of FIG. 5 in plan view and perspective view, respectively.
Figure 6:
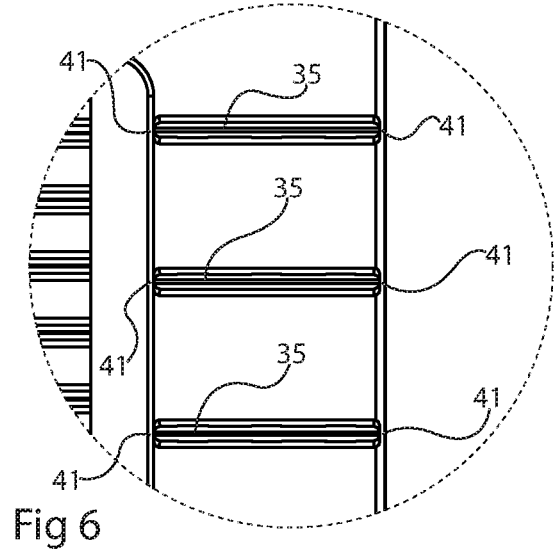

FIG. 5 illustrates schematically and in cross section a living hinge 35. FIGS. 6 and 7 show the living hinge 35 in plan view and perspective view, respectively. The living hinge generally comprises a thin, interconnecting portion 37 joining two wider segment portions 39, all being made in one piece through injection molding. A V-shaped groove is formed in between the two segment portions 39. Polypropylene, PP, and polyethylene, PE, are suitably used materials. Living hinges are well known per se. The hinge forms a joint that can be very easily bent, and with a plurality of living hinges located at regular interval as illustrated in FIG. 4, the extending portion as a whole becomes very easy to bend into a step-wise curvature. In the illustrated case the extending portion is configured to be more easily bent downwards, as, when bent upwards, said V-shaped grooves will eventually be closed and will limit the movement. When the extending portion is configured with arm portions, each living hinge is divided into two parts at the same location along which the extending portion extends from the central portion.

In an example, the segment portions have a thickness of 3 mm, while the interconnecting portion is only 0.3 mm thick. An interval between 2.0-4.5 mm is considered for the thicker portion, and 0.1-0.4 mm for the thinner. The cc distance between adjacent living hinges may be in the interval between 5-10 mm, a suitable distance being 8 mm. Needless to say these dimensions are examples and the skilled person can accomplish further variations within the scope of the appended claims.

A reinforcement flange 41 may interconnect the segment portions 39 at a location along the length of the living hinge 35. This reinforcement flange 41 substantially inhibits the function of the living hinge 35, i.e. prevents the connector plate to be bent in the living hinge 35, until the reinforcement flange 41 is broken. As the reinforcement flange 41 may be very thin, this is easily done, but unless bent with some force, the connector plate nevertheless remains more or less flat. A thickness of about 0.3 mm along the length of the living hinge 35, i.e. in the direction of the plane of the paper in FIG. 5 is considered.

There are alternative options for providing a more flexible extending portion. In one example, the extending portion is thinner than the central portion. If produced in one piece in the same plastic material, the extending portion will then be much more flexible about an axis which is perpendicular to the direction in which the extending portion extends from the central portion. Nevertheless, the extending portion may still contribute to keeping the dust bag in place within the vacuum cleaner.

In another example, the bending stiffness of the extending portion is reduced by the extending portion comprising a material with a lower modulus of elasticity than the central portion 11. For instance, the central portion 11 may be made in polypropylene, PP, while the extending portion may be made in a softer rubber composition. Two-component injection molding techniques exist that facilitate the production of such a connector plate. It would also be possible, to provide the softer material in stripes 45 across the extending portion 13d at regular intervals along the extending portion. This provides joints that make the extending portion flex into a step-wise curvature.

In a further example, the extending portion is provided partly as a waist portion extending from the central portion 11 and having a lesser width and consequently a lower bending stiffness. In general, the extending portion may then have a smaller extension in a lateral direction (with regard to the direction of insertion) than has the central portion 11. In this example, this is accomplished with the waist portion having the smaller lateral extension, but a similar effect can be accomplished in other ways. Alternatively, the extending portion and the central portion may for instance have reinforcements in a pattern configured to provide the lower bending stiffness in the extending portion. In one example reinforcement ribs extending in two directions could be used in the central part, while only reinforcement ribs extending across the direction of insertion are provided on the extending portion. Generally, differences in the geometry of the central part and the extending part may provide the difference in bending stiffness.

For instance, in yet another example (not shown), the extending portion is given a lower bending stiffness by providing a number of perforations being provided along the length of the extending portion. This may be done in a number of possible patterns and the perforations may be part of the mold, or may be punched in the extending portion after molding. It is not necessary in that example that the holes are full through holes as long as they weaken the extending portion to some extent.

Figure 9:
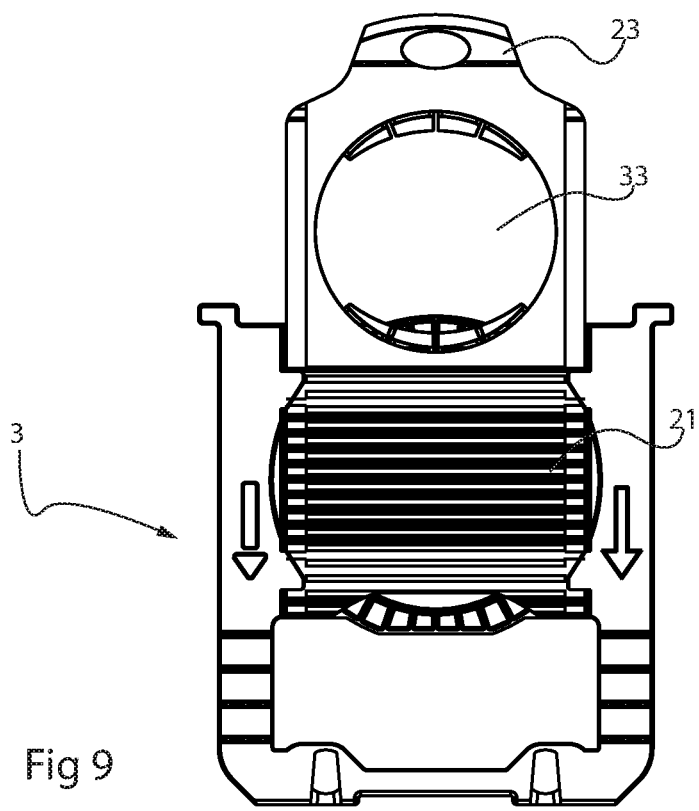
FIG. 9 illustrates use of the shutter on the connector plate.

FIG. 9 illustrates use of the shutter 21 on the connector plate 3. Generally, the shutter 21 can be used to close the opening 9, once the dust bag 5 is full and the dust container 1 is to be replaced. As the shutter 21 substantially seals the opening 9, it can be prevented to a great extent that collected dust leaks out of the dust bag when handled to be disposed.

In the present disclosure, the shutter 21 is thin enough to be easily folded, and is connected to the central portion 11 in between the lateral arm portions 17. It may be made in one piece with the remainder of the connector plate 3. The shutter 21 has an opening 33, and is folded on top of the central portion 11 such that the shutter opening 33 coincides with the opening 9 of the dust bag 5, which is the state illustrated in FIG. 2. The shutter is tucked in under guide tabs 25 provided at both sides of the opening and remains slidable, guided by the guide tabs 25 and the rear surface 27 behind the guide tabs. The shutter can thus be slid upwards in FIG. 2, away from the extending part 13, such that the shutter opening 33 moves away from the dust bag opening 9, thereby effectively closing this opening. This state is shown in a front view in FIG. 9. The distal end of the shutter may comprise a handle 23 to facilitate this operation.

The present disclosure is not limited to the examples described above, and may be varied and altered in different ways within the scope of the appended claims. For instance, other materials than polypropylene may be considered, such as polyethylene, PE.

The invention claimed is:
1. A dust container for a vacuum cleaner, the dust container comprising:
    a dust bag, made of an air permeable material having an opening therethrough; and
    a connector plate, surrounding the opening, whereby the connector plate is configured to correctly position the opening within a vacuum cleaner by the connector plate being slid into a holder of the vacuum cleaner, the connector plate comprising:

a central portion surrounding the opening, and an extending portion projecting in a first direction from the central portion in a plane of the central portion, the extending portion having a lower bending stiffness about an axis perpendicular to the first direction than has the central portion, such that the extending portion is bendable out of the plane of the central portion into a step-wise or continuous curvature without bending the central portions;

wherein the extending portion comprises lateral arm portions extending from the central portion and a bridge portion interconnecting the arms at their distal ends.

2. The dust container according to claim 1, wherein the extending portion has a first bending stiffness about the axis perpendicular to the first direction and towards the dust bag, and a second bending stiffness about the axis perpendicular to the first direction and away from the dust bag, the first bending stiffness being less than the second bending stiffness.

3. The dust container according to claim 1, wherein the central portion and the extending portion have a substantially uniform width from a distal edge of the extending portion to the edge of the central portion opposite to the distal edge.

4. The dust container according to claim 1, wherein the extending portion comprises a plurality of living hinges located along the extending portion at regular intervals along the first direction, the plurality of living hinges providing the extending portion with the lower bending stiffness.

5. The dust container according to claim 4, wherein the plurality of living hinges are provided at three to six locations along the first direction.

6. The dust container according to claim 4, wherein a thickness of segment portions in between adjacent pairs of the plurality of living hinges is in the range 2.0-4.5 mm, and a thickness at each living hinge is in the range 0.1-0.4 mm.

7. The dust container according to claim 1, wherein the extending portion is configured to have a lower bending stiffness by being thinner than the central portion.

8. The dust container according to claim 1, wherein the extending portion is configured to have a lower bending stiffness by comprising a material with a lower modulus of elasticity than the material of the central portion.

9. The dust container according to claim 1, wherein the extending portion is configured to have a lower bending stiffness by means of a number of perforations being provided along the length of the extending portion.

10. The dust container according to claim 1, wherein the extending portion has a smaller extension in a lateral direction than has the central portion.

11. The dust container according to claim 1, wherein the extending portion and the central portion have reinforcements in a pattern configured to provide a lower bending stiffness in the extending portion.

12. The dust container according to claim 1, wherein at least one locking opening is provided in the bridge portion.

13. The dust container according to claim 1, wherein a shutter is connected to the central portion in between the lateral arm portions, the shutter having an opening and being folded on top of the central portion such that the shutter opening coincides with the opening of the dust bag, wherein the shutter is guided to close the opening by sliding the shutter away from the extending part.

14. The dust container according to claim 13, wherein the distal end of the shutter comprises a handle.

15. The dust container according to claim 1, wherein the connector plate consists of injection molded polypropylene, PP.

16. The dust container according to claim 1, wherein the extending portion is positioned to be leading in a direction of insertion into a holder, comprising means to interact with functions in the holder.

17. The dust container according to claim 16, wherein an indicator on the connector plate shows the direction of insertion.

18. A connector plate for a vacuum cleaner dust container, the connector plate comprising an opening, wherein the connector plate is configured to correctly position the opening within a vacuum cleaner by the connector plate being slid into a holder of the vacuum cleaner, wherein the connector plate comprises:

a central portion surrounding the opening; and an extending portion projecting in a first direction from the central portion in a plane of the central portion, the extending portion having a lower bending stiffness about an axis perpendicular to the first direction than has the central portion, such that the extending portion is bendable out of the plane of the central portion into a step-wise or continuous curvature without bending the central portions;

wherein the extending portion comprises lateral arm portions extending from the central portion and a bridge portion interconnecting the arms at their distal ends.

19. The dust container according to claim 13, wherein the shutter is configured such that, when the shutter opening coincides with the opening of the dust bag, the shutter extends to a distal shutter end located between the central portion and the bridge portion.

* * * * *